United States Patent [19]
Matsumura et al.

[11] Patent Number: 5,531,881
[45] Date of Patent: Jul. 2, 1996

[54] METHOD FOR CORRECTING DEFECT IN COLOR FILTER

[75] Inventors: Akira Matsumura, Hirakata; Masashi Ohata, Neyagawa; Mamoru Seio, Takatsuki, all of Japan

[73] Assignee: Nippon Paint Co., Ltd., Osaka-fu, Japan

[21] Appl. No.: 411,147

[22] Filed: Mar. 27, 1995

[30] Foreign Application Priority Data

Mar. 28, 1994 [JP] Japan ................................ 6-057036

[51] Int. Cl.⁶ .................................................. C25D 13/00
[52] U.S. Cl. ........................................ 204/507; 204/508
[58] Field of Search ........................... 204/181.7, 181.6, 204/180.2, 493, 500, 494, 508, 507

[56] References Cited

U.S. PATENT DOCUMENTS

| | | | |
|---|---|---|---|
| 4,130,472 | 12/1978 | Kaplan et al. | 204/181.5 |
| 5,246,804 | 9/1993 | Furukawa et al. | 430/20 |

FOREIGN PATENT DOCUMENTS

| | | |
|---|---|---|
| 0452027 | 10/1991 | European Pat. Off. . |
| 0523245 | 1/1993 | European Pat. Off. . |

OTHER PUBLICATIONS

Patent Abstracts of Japan, vol. 17, No. 399 (P-1579) 26 Jul. 1993.

*Primary Examiner*—John Niebling
*Assistant Examiner*—Kishor Mayekar
*Attorney, Agent, or Firm*—Wenderoth, Lind & Ponack

[57] ABSTRACT

Disclosed is a simple correction method of defects in color layer, which occur in production of color filter. The method does not have the problems associated with the conventional correction methods. The present invention provides a method for correcting defects in a color filter, comprising:

(a) forming an electrodeposited film having certain color by means of electrodeposition method on defect portions of a color filter which comprises a transparent substrate, a transparent electrode formed on at least a portion of the transparent substrate and a color layer having a color pattern formed thereon, wherein the color layer has defect portions that formation of the color layer is incomplete, and (b) curing the electrodeposited film with heat or ultraviolet light.

12 Claims, 5 Drawing Sheets

METHOD FOR CORRECTING DEFECT IN COLOR FILTER

FIELD OF THE INVENTION

The present invention relates to a method for correcting defects in a color layer, which occur in production of a color filter used for a device having a liquid crystal display, such as a color television, a personal computer, a video camera and the like.

BACKGROUND OF THE INVENTION

Color filters are widely used for liquid crystal color display devices and produced by art-known methods, for example a printing method, a dying method, a pigment dispersing method (Japanese Kokai Publication Sho 57(1982)-16407 corresponding U.S. Pat. No. 4,383,017), an electrodeposition method (Japanese Kokai Publication Sho 59(1984)-114572 corresponding U.S. Pat. No. 4,522,691), a resist electrodeposition method (Japanese Kokai Publication Hei 4(1992)-247402) and the like. It is generally desired that they have no defective picture elements thereof. It is, however, very difficult to produce a color filter having no picture element defects which are caused by small dust being present in surrounding production facilities or due to pinholes or foreign articles brought about by insufficient cleaning of substrates.

In order to increase yield rate in production of the color filters, some methods of correcting the defects in the color filters or lack of the picture elements have been proposed. For example, it is proposed that a colored photosensitive resin paint be coated on the defects. In this method, however, it is very difficult to make the surface of the corrected portion smooth, because the coating process has technical limits. A method is also proposed in which photosensitive resin paint solution is poured on the color filter having defects and the remaining solution on the normal portion is removed and then cured. It is, however, difficult to completely remove the paint solution on the undefective portion, which causes so-called scumming. Further, in the above two methods, if there are defects in plural color portions of the color layer, the steps of coating a photosensitive resin paint solution, exposing and developing are repeated plural times and therefore the repetition of the steps is time-consuming and troublesome. It may also give rise to other defects. Japanese Kokai Publication Hei 4(1992)-369604 proposes a modification of the above method wherein a protective layer is formed on the normal portion in the color layer before pouring the photosensitive resin paint solution on the color layer to avoid scumming, but the other problems still remain even in the modified process.

SUMMARY OF THE PRESENT INVENTION

The present invention provides a simple method of correcting defects in a color layer, which occur in production of a color filter. The method does not have the problems associated with the conventional correction methods.

Accordingly, the present invention provides a method for correcting defects in a color filter, comprising:

(a) forming an electrodeposited film having certain color by means of electrodeposition on defective portions of a color filter which includes a transparent substrate, a transparent electrode formed on at least a portion of the transparent substrate and a color layer having a color pattern formed thereon, wherein the color layer has defective portions that formation of the color layer is incomplete, and (b) curing the electrodeposited film with heat or ultraviolet light.

According to the correction method of the present invention, the corrected portions have smooth surface and, even when defects are present over plural colored picture elements, they are corrected in one electrodeposition process.

DETAILED DESCRIPTION OF THE INVENTION

In the present invention, the color filter having defects can be produced by art-known methods, but since the method of the present invention employs an electrodeposition process, the color filter should have an electroconductive layer under the color layer. The color filter of the present invention, therefore, comprises includes a transparent substrate, a transparent electrode formed on at least a portion of the transparent substrate and a color layer having a color pattern formed thereon, wherein the color layer has defective portions at which formation of the color layer is incomplete. Representative methods for producing the color filter used in the present invention are disclosed in Japanese Kokai Publication Hei 4(1992)-247402 corresponding EP-A-0,523,245 wherein a transparent electrode is formed all-over the surface of the transparent substrate; Japanese Kokai Publication Sho 59(1984)-114572 corresponding U.S. Pat. No. 4,522,691 wherein a transparent electrode having a specific pattern is formed on the transparent substrate; the description of the EP-A and U.S. Patent is herein incorporated.

Figure 1:
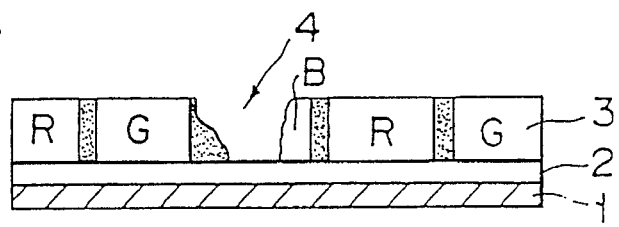
FIG. 1 shows a schematic cross section of one example of a color filter having defects.
Figure 2:
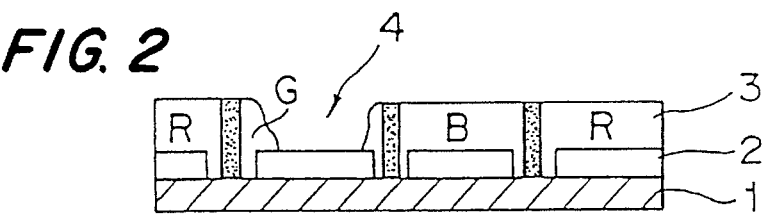
FIG. 2 shows a schematic cross section of another example of a color filter having defects.
Figure 3:
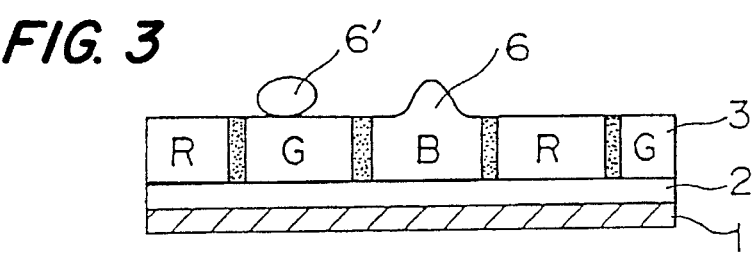
FIG. 3 shows a schematic cross section of another example of a color filter having defects.
Figure 4:
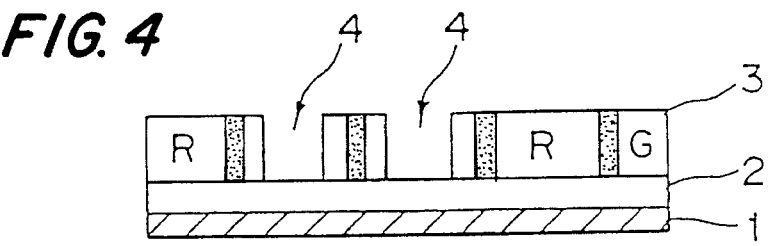
FIG. 4 shows a schematic cross section of an example of a color filter of which defective portions are removed by a laser.
Figure 5:
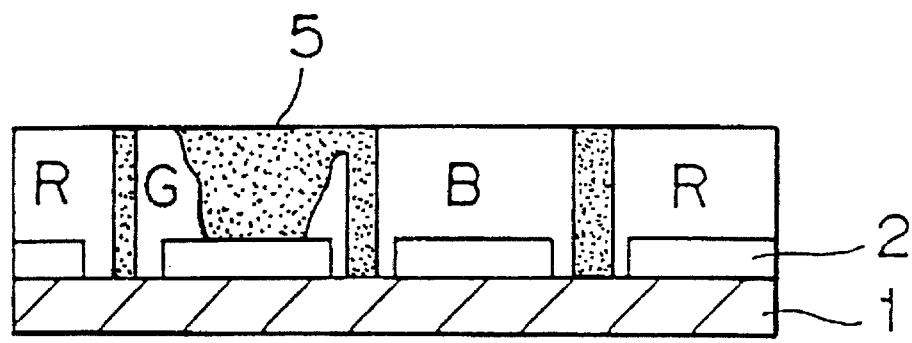
FIG. 5 shows a schematic cross section of an example of a color filter having been corrected by the method of the present invention.
Figure 6:
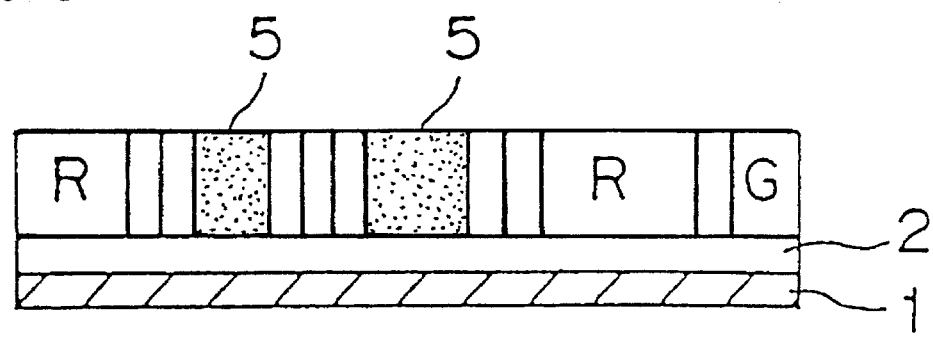
FIG. 6 shows a schematic cross section of another example of a color filter having been corrected by the method of the present invention.

The color filter obtained by the above methods may have such defects as shown in FIGS. 1 to 3. The color filter of FIG. 1 includes a substrate 1, a transparent electrode 2 formed all-over the substrate 1 and a color layer 3 consisting of four colors, i.e. red (R), green (G), blue (B) and black stripe, formed on the transparent electrode 2, wherein a portion 4 of the color layer 3 is lacking. The color filter of FIG. 2 includes a substrate 1, a transparent electrode 2 formed on a portion of the substrate and a color layer 3 consisting of four colors, i.e. red (R), green (G), blue (B) and black stripe, formed on the transparent electrode 2, wherein a portion 4 of the color layer 3 is lacking. The color filter of FIG. 3 is similar to that of FIG. 1, but a small foreign article 6' such as small dust and a protrusion 6 of the color layer 3 are present instead of the backing portion 4. In the present invention, the defects to be corrected are not limited to the above three examples and the present invention can treat any type of defects other than the above examples. For example, it is included that picture elements are formed up to about half the height expected and are not formed to a necessary height. If the defects are present but the transparent electrode is not sufficiently exposed to conduct electrodeposition, the defects may be subjected to a removing means, such as a laser beam to remove the defected picture elements until the electrode is exposed. The laser-treated color filter is shown in FIG. 4.

Where the defects are present in the color filter as explained above, the transparent electrode 2 of the color filter is connected to an electric source and electrodeposition is conducted to fill a certain color film in the defects. FIGS. 5 and 6 show examples of the corrected color filter of the present invention.

Electrodeposition is well known to the art and the correction process by electrodeposition need not be explained. However, for example, the color filter which has been connected with the electric source is dipped in a electrodeposition bath having specific color (containing an aqueous resin and a coloring agent in an aqueous medium) and electric current is applied. Electrodeposition may be conducted at 1 to 100 volts for 1 to 60 seconds. Time of more than 60 seconds increases insulation by electrodeposited film and does not enhance efficiency of electrodeposition.

Figure 7A:
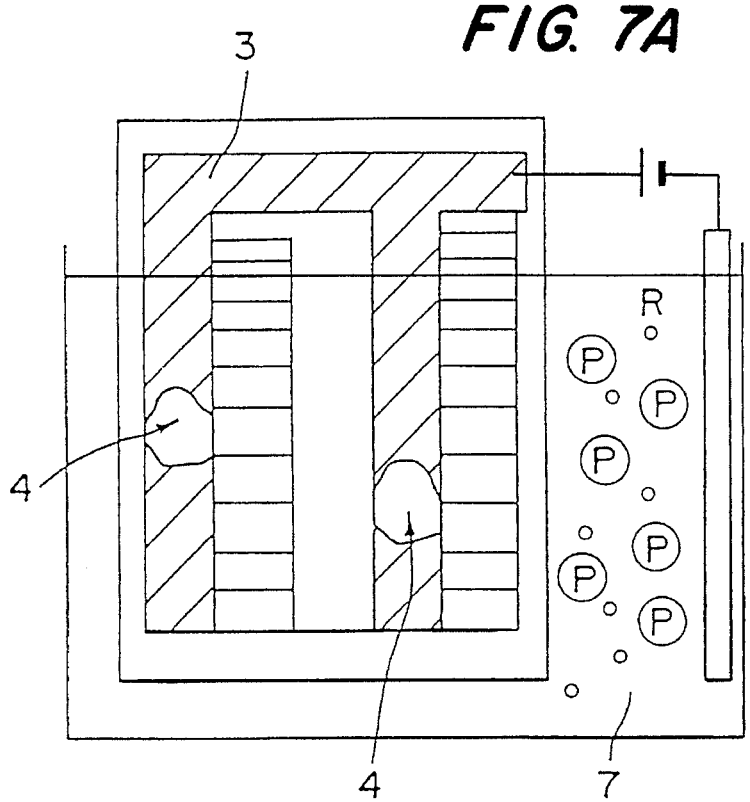
FIG. 7 schematically shows that the method of the present invention is conducted using an electrodeposition bath.
Figure 7B:
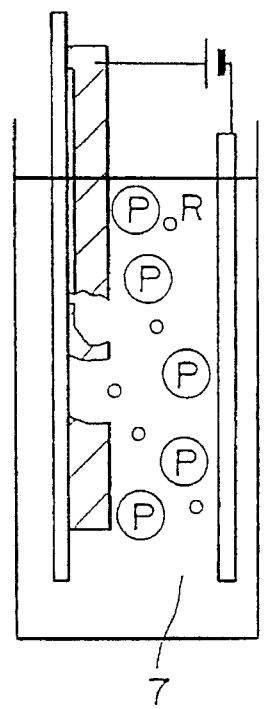
Figure 8:
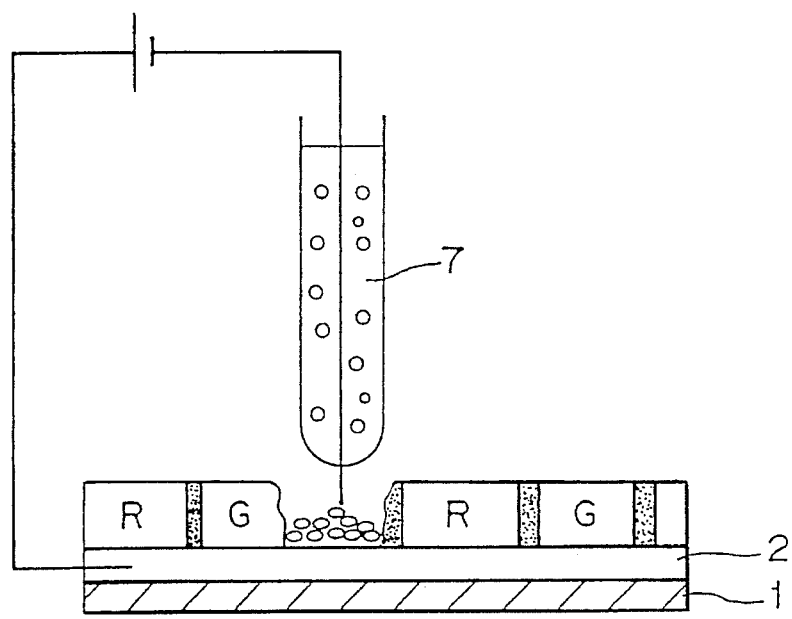
FIG. 8 schematically shows that the method of the present invention is conducted by a selective pin-point electrodeposition method.

FIG. 7 schematically shows electrodeposition using the electrodeposition bath, and 3 indicates a color layer and 4 shows defects present in the color layer 4. The electrodeposition bath is shown as 7 and the transparent electrode is connected to an anode to conduct electrodeposition.

As one of the electrodeposition method, a so-called selective pin-point electrodeposition is known to the art, for example Japanese Kokoku Publication Sho 51(1976)-37204 discloses a process for forming a uniform electrodeposited film by electrocoating merely on defects of a first electrodeposited film. The selective pin-point electrodeposition method is very useful to merely correct a few picture elements.

The color of the electrodeposition solution to be employed in the present invention is preferably the same color as the color layer containing a defect. However, if the defects are present in plural colors, the facilities and processes for the present invention are made complicated. Accordingly, it is possible in the correction process of the present invention to use only a black color electrodeposition bath which effectively prevents the defects from leaking light.

The electrodeposition solution to be employed in the present invention can be either cationic or anionic and is fully explained in Japanese Kokai Publication Sho 63(1988)-210901 or Japanese Kokai Publication Sho 60(1085)-23830 corresponding to U.S. Pat. No. 4,639,088. The electrodeposition solution generally contains an electrodepositable base resin, a curing agent and a pigment in an aqueous medium. An anionic electrodepositable base resin representatively includes a polyester resin having carboxylic group which is partially neutralized with base. A cationic electrodepositable base resin representatively includes a resin having amino group which is partially neutralized with acid. The base resins are not limited thereto. Typical examples of the curing agents are melamine resin, blocked isocyanate and the like. Typical examples of the pigments are carbon black, ion oxide red and the like. The above mentioned components are dispersed in an aqueous medium to form an electrodeposition solution.

EXAMPLES

The present invention will be explained by the following Examples which, however, are not to be construed as limiting the present invention to their details.

Example 1

Figure 9A:
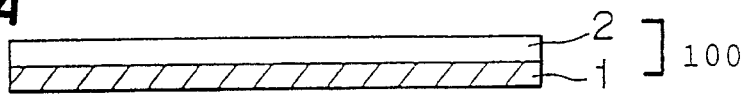
FIG. 9 schematically shows a process drawing of an example of the method of the present invention.
Figure 9B:
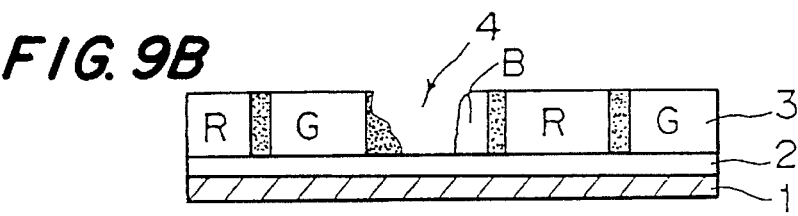

FIGS. 9 and 10 show processes of the correction method of the present invention.

Figure 10A:
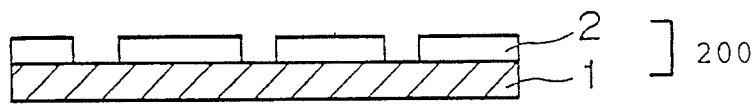
FIG. 10 schematically shows a process drawing of another example of the method of the present invention.

As shown in FIG. 9(A), an ITO transparent electrode 2 (indium tin oxide) was formed by spattering on a transparent substrate 1 to form a base substrate 100. In FIG. 10(A), the base substrate obtained in FIG. 9(A) was coated with a positive-type photoresist (available from Nippon Paint Co. Ltd. as Excereed PR-145 comprising a polymer of t-butyl methacrylate, methacrylic acid and other (meth)acrylates, and a sulfonium salt-type photosensitive material) in a thickness of 2 μm by a spinner, on which a photomask having a certain pattern was contacted, and then exposed to ultraviolet at a power of 100 mJ/cm². The resulting base substrate was developed with a basic developer (available from Nippon Paint Co. Ltd. as Excereed DP-034 comprising an amine compound and water) to form a patterned resist layer, and then the exposed ITO electrode was etched with an aqueous ferric chloride solution. The remaining photoresist layer was removed to form a base substrate 200 having a patterned transparent electrode.

Figure 9C:
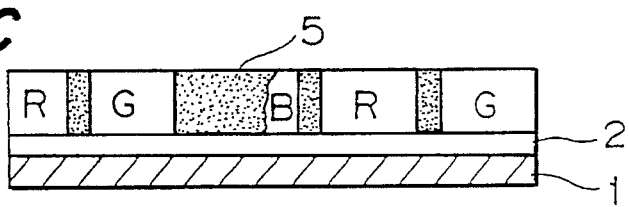
Figure 10B:
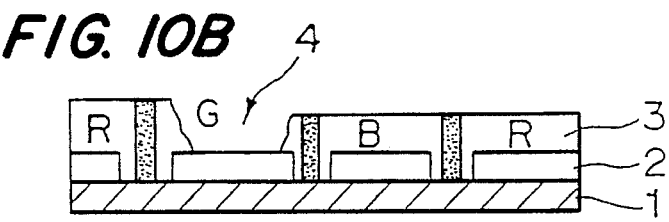

The base substrate 100 of FIG. 9(A) was subjected to a resist electrodeposition method as explained in PCT/JP92/00079 (corresponding U.S. patent application Ser. No. 07/930514 and EP-A-0 523 245) to form a color layer 3 on the ITO electrode, but as shown in FIG. 9 (B) a pin hole 4 in a blue (B) picture element was present and a surface of the ITO electrode was exposed. The base substrate 200 of FIG. 10(A) was subjected to an electrodeposition method as explained in PCT/JP92/00079 to form a color layer 3 on the patterned ITO electrode, but as shown in FIG. 10(B) a pin hole 4 in a green (G) picture element was present and a surface of the ITO electrode was exposed.

The both substrates having the defects were dipped in an electrodeposition bath to conduct electrodeposition. Electrodeposition was conducted by connecting the ITO electrode to an anode and the electrodeposition bath to a cathode and by applying a direct current of 5 volt for 3 seconds. The electrodeposition bath contained the following ingredients.

| Ingredients | Parts by weight |
| --- | --- |
| Anionic electrodeposition paint | 7.5 |
| Methyl cellosolve | 9.0 |
| Pigment | 2.3 |
| Deionized water | 81.2 |

Figure 10C:
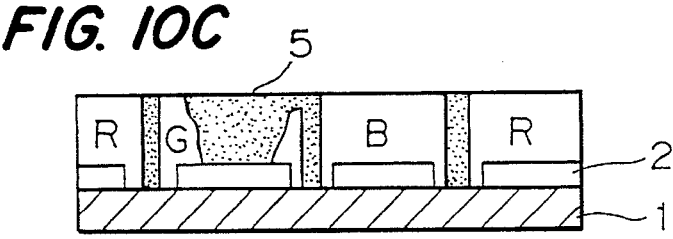

After finishing electrodeposition, the substrates were rinsed with water and dried. They were then cured at a temperature of 175° C. for 30 minutes in an oven to obtain corrected color filters as shown in FIGS. 9(C) and 10(C).

Example 2

FIG. 11 shows another embodiment of a correction process of the present invention.

Figure 11A:
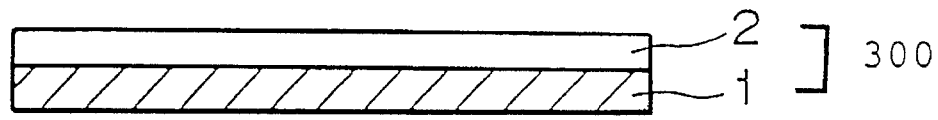
FIG. 11 schematically shows a process drawing of a further example of the method of the present invention.
Figure 11B:
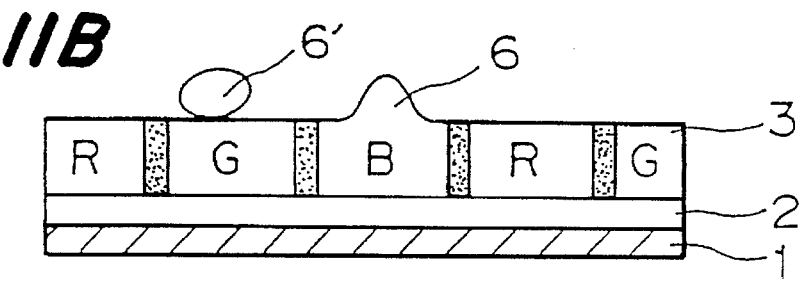
Figure 11C:
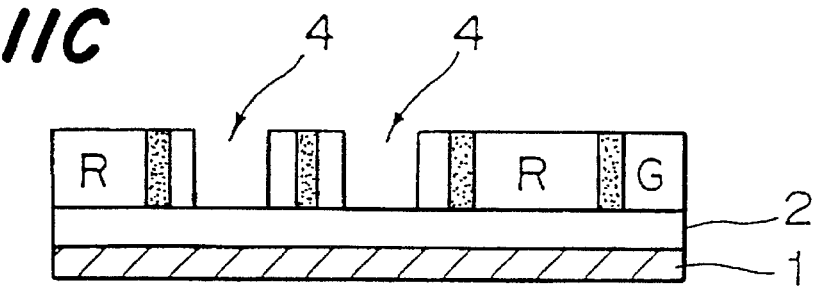
Figure 11D:
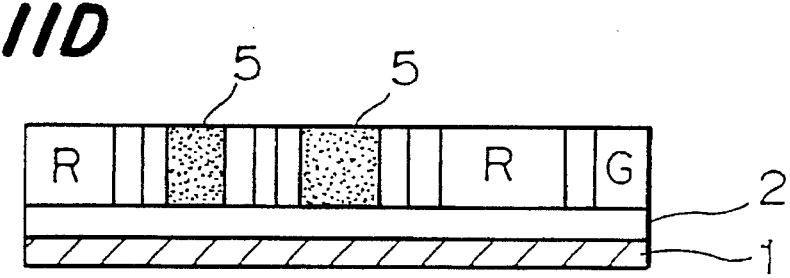

The substrate 300 of FIG. 11(A) was the same as obtained in FIG. 9(A).

The substrate 300 was subjected to a resist electrodeposition method as explained in Example 1 to form a color layer 3 on the ITO electrode, but a tiny dust 6' was present on a green (G) picture element and a protrusion 6 was also present in another green (G) picture element. Each picture element having the defect was exposed to a laser beam at a power of 2 mJ/pulse to remove a small area (about 50 μm$^2$) of the color layer including the defect to form a color filter having removed the defect portions in which an ITO surface underlying the removed color layer was exposed.

The ITO electrode was connected to an anode and a cartridge container containing an electrodeposition solution was connected to a cathode. The electrodeposition solution contained the following ingredients.

| Ingredients | Parts by weight |
| --- | --- |
| Cationic electrodeposition paint | 9.5 |
| Methyl cellosolve | 7.0 |
| Pigment | 2.5 |
| Deionized water | 81.0 |

On the portion in which the ITO electrode was exposed, the electrodeposition solution was dropped from the cartridge container and the cathode line was dipped in the electrodeposition solution drop, to which a direct current having 5 volts was applied for 5 seconds. After finishing electrodeposition, the cartridge container was removed and the substrate was rinsed and dried. It was then exposed to a ultrahigh pressure mercury lamp at 500 mJ/cm$^2$ from the side of the substrate 1. Then, it was dipped in a developer (Excereed DP-034)for two minutes to elute the uncured portion of the electrodeposited film, and heated at a temperature of 100° C. for 30 minutes to cure. The resulting substrate was shown in FIG. 11(C).

According to the method of the present invention, correction of a color filter having defects is easily conducted by electrodeposition. The method provides a smooth surface after correction and gives substantially no scumming. Since electrodeposition has good throwing power, the color filter corrected by the present invention has no void in the color layer and has high quality. The present invention produces color filters at a very high yield.

What is claimed is:

1. A method for correcting defective portions of a color filter, the color filter including a transparent substrate, a transparent electrode formed on at least a portion of the transparent substrate, and a color layer having a multi-color pattern formed on at least a portion of the transparent electrode, the color layer being removable by a laser beam and containing the defective portions at which the color layer is incomplete, said method comprising:

electrodepositing a black film on the defective portions of the color filter such that the black film covers exposed portions of the transparent electrode underlying the defective portions; and, curing the black film electrodeposited on the defective portions.

2. A method as recited in claim 1, further comprising, prior to said electrodepositing of the black film, applying a laser beam to the defective portions of the color filter to remove the color layer at the defective portions to expose the portions of the transparent electrode underlying the defective portions.

3. A method as recited in claim 1, wherein said electrodepositing step includes dipping the color filter into an electrodepositable solution and then applying an electric current thereto.

4. A method as recited in claim 2, wherein said electrodepositing step includes dipping the color filter into an electrodepositable solution and then applying an electric current thereto.

5. A method as recited in claim 1, wherein said electrodepositing step includes conducting a selective pin-point electrodeposition.

6. A method as recited in claim 2, wherein said electrodepositing step includes conducting a selective pin-point electrodeposition.

7. A method for correcting defective portions of a color filter, the color filter including a transparent substrate, a transparent electrode formed on at least a portion of the transparent substrate, and a color layer having a single-color pattern formed on at least a portion of the transparent electrode, the color layer being removable by a laser beam and containing the defective portions at which the color layer is incomplete, said method comprising:

electrodepositing a film of the same color as the single-color pattern on the defective portions of the color filter such that the film covers exposed portions of the transparent electrode underlying the defective portions; and, curing the film electrodeposited on the defective portions.

8. A method as recited in claim 7, further comprising, prior to said electrodepositing the film, applying a laser beam to the defective portions of the color filter to remove the color layer at the defective portions to expose the portions of the transparent electrode underlying the defective portions.

9. A method as recited in claim 7, wherein said electrodepositing step includes dipping the color filter into an electrodepositable solution and then applying an electric current thereto.

10. A method as recited in claim 8, wherein said electrodepositing step includes dipping the color filter into an electrodepositable solution and then applying an electric current thereto.

11. A method as recited in claim 7, wherein said electrodepositing step includes conducting a selective pin-point electrodeposition.

12. A method as recited in claim 8, wherein said electrodepositing step includes conducting a selective pin-point electrodeposition.

* * * * *